(12) United States Patent
Chen et al.

(10) Patent No.: US 10,036,592 B2
(45) Date of Patent: Jul. 31, 2018

(54) METHOD AND MOBILE VEHICLE PLATFORM DEVICE FOR DRYING BIOMASS FUEL

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Shuchuan Hu, Wuhan (CN); Yanfeng Zhang, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 0 days.

(21) Appl. No.: 15/607,447

(22) Filed: May 27, 2017

(65) Prior Publication Data

US 2017/0261260 A1    Sep. 14, 2017

Related U.S. Application Data

(63) Continuation-in-part of application No. PCT/CN2015/092502, filed on Oct. 22, 2015.

(30) Foreign Application Priority Data

Nov. 28, 2014    (CN) .......................... 2014 1 0712312

(51) Int. Cl.
*F26B 19/00*    (2006.01)
*F26B 3/04*    (2006.01)
(Continued)

(52) U.S. Cl.
CPC .............. *F26B 19/005* (2013.01); *F26B 3/04* (2013.01); *F26B 3/283* (2013.01); *F26B 3/02* (2013.01); *F26B 3/28* (2013.01); *F26B 11/00* (2013.01)

(58) Field of Classification Search
CPC .......... F26B 19/005; F26B 3/04; F26B 3/283; F26B 3/02; F26B 3/28; F26B 11/00
(Continued)

(56) References Cited

U.S. PATENT DOCUMENTS 3,802,089 A * 4/1974 Stephanoff .............. C02F 11/12
34/327
3,946,495 A * 3/1976 Osdor ................. F26B 17/1483
34/166
(Continued)

FOREIGN PATENT DOCUMENTS

FR        2933326 A1 * 1/2010 .............. B27L 11/00
WO    WO 2010000982 A3 * 4/2010 .............. B27L 11/00

*Primary Examiner* — Stephen M Gravini
(74) *Attorney, Agent, or Firm* — Matthias Scholl P.C.; Matthias Scholl

(57) ABSTRACT

A method for drying biomass fuel, including: 1) collecting and cutting raw biomass fuel into fragments; mechanically squeezing and dehydrating the fragments to yield biomass fuel in the form of filter cake; 2) mashing and loosening the biomass fuel in the form of filter cake; and loading the biomass fuel onto charging carriages of fuel transport vehicles; 3) connecting tails of the fuel transport vehicles and the carrier vehicle of drying equipment; moving the movable drying room of the carrier vehicle of drying equipment onto the fuel transport vehicles; 4) convectively drying the biomass fuel in the charging carriages; 5) exhausting air in the movable drying room following convective drying; and 6) moving the movable drying room to cover and seal
(Continued)

the charging carriages of a next fuel transport vehicle following radiant drying. A mobile device for drying biomass fuel is also provided.

21 Claims, 6 Drawing Sheets

(51) Int. Cl.
*F26B 3/28* (2006.01)
*F26B 3/02* (2006.01)
*F26B 11/00* (2006.01)

(58) Field of Classification Search
USPC .......................................................... 34/523
See application file for complete search history.

(56) References Cited

U.S. PATENT DOCUMENTS

| | | | | |
|---|---|---|---|---|
| 6,256,902 B1* | 7/2001 | Flaherty | ................ | F26B 17/101 110/222 |
| 7,024,800 B2* | 4/2006 | Carin | .................... | F26B 19/005 34/576 |
| 7,610,692 B2* | 11/2009 | Carin | .................... | F26B 23/022 34/388 |
| 7,669,349 B1* | 3/2010 | Palmer | .................... | F26B 11/16 210/770 |
| 7,685,737 B2* | 3/2010 | Gorbell | ................ | F26B 19/005 210/788 |
| 2017/0261260 A1* | 9/2017 | Chen | .................... | F26B 19/005 |

\* cited by examiner

METHOD AND MOBILE VEHICLE PLATFORM DEVICE FOR DRYING BIOMASS FUEL

CROSS-REFERENCE TO RELATED APPLICATIONS

This application is a continuation-in-part of International Patent Application No. PCT/CN2015/092502 with an international filing date of Oct. 22, 2015, designating the United States, now pending, and further claims foreign priority benefits to Chinese Patent Application No. 201410712312.5 filed Nov. 28, 2014. The contents of all of the aforementioned applications, including any intervening amendments thereto, are incorporated herein by reference.

BACKGROUND OF THE INVENTION

Field of the Invention

The invention relates to a method and a mobile vehicle platform device for drying biomass fuel.

Description of the Related Art

Raw biomass fuel has a moisture content of between 50 and 70% and requires drying before further use in power plants. Conventionally, raw biomass fuel is bought from farmers and transported to power plants which are often located in remote areas, resulting in high transportation costs. In addition, each power plant must be provided with a processing and drying line so as to process and dry the biomass fuel, leading to high construction cost and high power generation cost.

SUMMARY OF THE INVENTION

In view of the above-described problems, it is one objective of the invention to provide a method and a mobile vehicle platform device for drying biomass fuel. The method and device can dry the raw biomass fuel on-site, thus reducing the transportation cost, and reducing the construction cost of power plants and the power generation costs.

To achieve the above objective, in accordance with one embodiment of the invention, there is provided a method for drying biomass fuel. The method employs a plurality of independent functional vehicles instead of fixed workshop type drying line to dry biomass fuel. The functional vehicles comprise at least one carrier vehicle of drying equipment and a plurality of fuel transport vehicles. The at least one carrier vehicle of drying equipment comprises a movable drying room. The fuel transport vehicle comprises a plurality of charging carriages. The method comprises:

1) preprocessing raw materials: cutting raw biomass fuel into fragments in length of between 20 and 50 mm at distributing centers of biomass fuel; mechanically squeezing and dehydrating the fragments to yield biomass fuel in a form of filter cake, a moisture content in the biomass fuel in the form of filter cake being reduced to at least below 50%;
2) loading the biomass fuel: mashing and loosening the biomass fuel in the form of filter cake; and loading the biomass fuel in the charging carriages of the fuel transport vehicles;
3) connecting corresponding functional vehicles: connecting tails of the fuel transport vehicles and the at least one carrier vehicle of drying equipment; moving the movable drying room of the at least one carrier vehicle of drying equipment to the fuel transport vehicle, the charging carriages being covered and sealed in an inner chamber of the movable drying room;
4) drying the biomass fuel: convectively drying the biomass fuel in the charging carriages in the inner chamber of the movable drying room using circulating dry air at a temperature of between 100 and 180° C., and a speed of the circulating dry air being controlled to be between 1.5 and 2.0 m/s; decreasing the moisture content in the biomass fuel using the dry air, and regularly exhausting moisture till a drying rate appears to be obviously lowered;
5) drying the biomass fuel using radiation: following the convective drying, exhausting air in the movable drying room; controlling a pressure in the movable drying room to be between 5,000 and 50,000 Pa; controlling a temperature in the movable drying room to be lower than 85° C.; transferring radiant heat to the biomass fuel and dehydrating the biomass fuel, a moisture content of the biomass fuel in the charging carriages being reduced to lower than 35%;
6) operating repeatedly: following the radiant drying, moving the movable drying room to cover and seal the charging carriages on next fuel transport vehicle; repeating 4)-5) until all of the biomass fuel in the fuel transport vehicles is dried;
7) transporting the biomass fuel: directly transporting dried biomass fuel in the fuel transport vehicles to a power plant without extra discharging and loading process.

In a class of this embodiment, in 4), moisture is exhausted when an air humidity in the movable drying room is between 85 and 92%. Moisture exhaustion is ended when the air humidity is reduced to between 50 and 60%. When the air humidity in the movable drying room is constant, the convective drying is completed.

In a class of this embodiment, in 5), a temperature in movable drying room is controlled to be between 60 and 80° C. Moisture is exhausted when the air humidity in the movable drying room is between 85 and 92%. The radiant drying is completed when the moisture content in the biomass fuel is decreased to between 25 and 33%.

In a class of this embodiment, in 6), the movable drying room is returned to the at least one carrier vehicle of drying equipment. The tail of the at least one carrier vehicle of drying equipment is connected to a tail of next fuel transport vehicle thereafter, and the movable drying room is moved onto the next fuel transport vehicle.

In a class of this embodiment, in 6), the tail of the fuel transport vehicle is connected to a tail of next fuel transport vehicle, and the movable drying room is directly moved onto the next fuel transport vehicle. The movable drying room is returned to the at least one carrier vehicle of drying equipment when all of the biomass fuel in the fuel transport vehicles are dried, thus saving time in fuel loading and unloading, reducing the step to return the movable drying room to the at least one carrier vehicle of drying equipment, largely decreasing the set-up time, and improving the drying efficiency of the biomass fuel.

In a class of this embodiment, the functional vehicles further comprise carrier vehicles of auxiliary equipment. The carrier vehicles of auxiliary equipment comprise at least one carrier vehicle of heating equipment and at least one energy supply vehicle.

Under the working condition, an energy output end of the energy supply vehicle is connected to an energy input end of the carrier vehicle of heating equipment. A heat source output end of the carrier vehicle of heating equipment supplies heat source for the movable drying room of the at least one carrier vehicle of drying equipment and heats air current in the movable drying room.

In a class of this embodiment, the carrier vehicles of auxiliary equipment further comprise a tool vehicle. The tool vehicle is loaded with a vehicle-mounted press dehydrator, a mobile cutting machine, and an air exhauster.

Under the working condition, the tool vehicle moves to the distributing centers of biomass fuel. The biomass fuel is cut and pressed using the vehicle-mounted press dehydrator and the mobile cutting machine on the tool vehicle. Air in the movable drying room of the at least one carrier vehicle of drying equipment is exhausted using the air exhauster on the tool vehicle.

Therefore, a complete drying line of biomass fuel using mobile vehicle platforms is formed at the distributing centers of biomass fuel, and the biomass fuel is timely, quickly, and efficiently dried and processed at the distributing centers. The drying line of biomass fuel at conventional fixed workshop is replaced, thus saving equipment and warehouse costs, avoiding wet fuel long-distance transportation and secondary drying at the power plant, decreasing fuel cost of the power plant, and improving the profits of the power plant.

The invention further provides a mobile vehicle platform device for drying biomass fuel. The device comprises a plurality of independent functional vehicles. The functional vehicles comprise at least one carrier vehicle of drying equipment and a plurality of fuel transport vehicles;

the at least one carrier vehicle of drying equipment comprises a first track and a movable drying room. The first track is disposed lengthwise on a floor of the at least one carrier vehicle of drying equipment. The movable drying room is disposed on the first track. An end surface of the movable drying room is provided with a door. One end of a top of the movable drying room is provided with a supply-air inlet. A blower is disposed at a supply-air channel of the supply-air inlet. The other end of the top of the movable drying room is provided with an air outlet. An exhaust fan is disposed at the air outlet. A heat supply device is disposed on a side wall of an inner chamber of the movable drying room. A circulating fan is disposed on a top of the inner chamber of the movable drying room. A temperature and humidity sensor is also disposed in the inner chamber of the movable drying room. A signal output end of the temperature and humidity sensor is connected to actuators of the blower and the exhaust fan, respectively. An air exhauster access is disposed on an outer wall of the movable drying room.

The fuel transport vehicles comprise a second track, a third track, and a plurality of charging carriages. The second track is disposed lengthwise on a floor of the fuel transport vehicles. A plurality of charging carriages is connected in order and is disposed on the second track. The third track is at an external side of the second track, and the second track and the third track are in parallel. Specifications of the third track and the first track are identical, thus when a tail of the fuel transport vehicles is connected to a tail of the at least one carrier vehicle of drying equipment, the third track is in line with the first track. The movable drying room is moved to cover the charging carriages on the fuel transport vehicles from the at least one carrier vehicle of drying equipment.

In a class of this embodiment, the functional vehicles further comprise carrier vehicles of auxiliary equipment. The carrier vehicles of auxiliary equipment comprise at least one carrier vehicle of heating equipment and at least one energy supply vehicle. Under the working condition, an energy output end of the energy supply vehicle is connected to an energy input end of the carrier vehicle of heating equipment. A heat source output end of the carrier vehicle of heating equipment is connected to the heat supply device in the movable drying room and heats air current in the movable drying room.

In a class of this embodiment, the heat supply device is light tube radiators disposed on two side walls of the inner chamber of the movable drying room. The carrier vehicle of heating equipment is loaded with a vehicle-mounted steam boiler. A steam output end of the vehicle-mounted steam boiler is connected to a steam input end of the light tube radiators via a first heat pipe.

In a class of this embodiment, the carrier vehicle of heating equipment is loaded with a steam-air heat exchanger. The steam output end of the vehicle-mounted steam boiler is connected to the steam input end of the light tube radiators via a first heat pipe, and is connected to a steam inlet of the steam-air heat exchanger via a second heat pipe. A hot air outlet of the steam-air heat exchanger is connected to a hot air inlet on the outer wall of the movable drying room and provides supplemental heat source for the current in the movable drying room.

In a class of this embodiment, the energy supply vehicle is a natural gas tank truck or a diesel tank truck.

In a class of this embodiment, the carrier vehicles of auxiliary equipment further comprise a tool vehicle. The tool vehicle is loaded with a vehicle-mounted press dehydrator, a mobile cutting machine, and an air exhauster. Under the working condition, the air exhauster is connected to the air exhauster access on the movable drying room, and air in the movable drying room on the carrier vehicle is exhausted, and the movable drying room is in a micro-pressure state.

In a class of this embodiment, the movable drying room comprises a first roller. The first roller is disposed on a bottom part of the movable drying room and matches with the first track. A shaft of the first roller is provided with a roller drive. The roller drive is configured to actuate automatic movements of the movable drying room.

In a class of this embodiment, the roller drive is a motor speed reduction mechanism.

In a class of this embodiment, the circulating fan is disposed at a central part of the top of the inner chamber of the movable drying room. A direction of air current output from the circulating fan is identical with lengthwise direction of the movable drying room. The temperature and humidity sensor is disposed on the top of the inner chamber of the movable drying room in the vicinity of the air outlet.

In a class of this embodiment, a heat recovery unit is disposed outside on a top of movable drying room. The heat recovery unit comprises a first area and a second area. The first area is separated from the second area, and a temperature in the first area is higher than a temperature in the second area. One end of the first area comprises a gas outlet, and the other end of the first area comprises a gas inlet. The gas outlet is communicated with atmosphere. The gas inlet is connected to the air outlet. One end of the second area comprises a preheated air outlet, and the other end of the second area comprises an air inlet. The preheated air outlet is connected to the supply-air inlet.

In a class of this embodiment, two sides of the end surface of the movable drying room are provided with turning plates. The turning plates are configured to seal the door of the movable drying room.

In a class of this embodiment, the movable drying room is box-shaped with an open bottom. A side wall, a top plate, and the door of the movable drying room are metal sheet frame structures, and are provided with an insulating liner.

In a class of this embodiment, the charging carriages comprise an upper fuel stacking layer and a lower fuel stacking layer. A ventilation clearance is disposed between the upper fuel stacking layer and the lower fuel stacking layer. A second roller is disposed at a bottom part of the charging carriages and matches with the second track, thus the charging carriages separate from the fuel transport vehicles during fuel unloading.

In a class of this embodiment, an active inserter is disposed on a bottom part of the upper fuel stacking layer of the charging carriages. In use, the active inserter is moved out and the biomass fuel is stacked at the lower fuel stacking layer first; the active inserter is then mounted on the bottom part of the upper fuel stacking layer, and the biomass fuel is stacked at the upper fuel stacking layer.

Advantages of the method and the device for drying biomass fuel according to embodiments of the invention are summarized as follows:

1. The biomass fuel is in strong demand, however, because the distributing centers of the biomass fuel are far from each other, and every single distributing center can only provide small amount of biomass fuel, a large number of bases need to be built to dry the biomass fuel, which results in big investment, large energy consumption, low utilization rate of drying equipment, and big waste. The method and the mobile vehicle platform device for drying biomass fuel break the conventional concept, and the conventional fixed workshop is changed to the mobile vehicle platform device. The device can be flexibly moved to a plurality of distributing centers to perform on-site drying of the biomass fuel, thus greatly improving the utilization rate of drying equipment, reducing equipment cost and energy consumption, and decreasing land occupation.

2. The device for drying biomass fuel comprises the movable drying room. The movable drying room can be quickly moved to dry the fuel on the charging carriages of the fuel transport vehicles, and quickly return from the fuel transport vehicles when the drying is completed, thus the movable drying room is flexible and convenient in use. The workload of loading and unloading the fuel is decreased to a large extent. Labors no longer need to work at the high-temperature drying room, thus the working condition and working efficiency are improved.

3. The method for drying biomass fuel combines the high-temperature convective drying method with the low-temperature micro-pressure radiant drying. The low-temperature micro-pressure radiant drying is actuated when the drying rate of the convective drying obviously decreases. The principle of the low-temperature micro-pressure radiant drying is: during the vaporization process of water, the temperature is proportional to the vapor pressure; when the temperature in the movable drying room is about 80° C., the pressure in the movable drying room is 50,000 Pa, and the dehydration rate of the fuel is increased between 16 and 17% than that under normal pressure; and when the pressure in the movable drying room is 5,000 Pa, the dehydration rate of the fuel is increased between 62 and 63% than that under normal pressure, and the dehydration rate get even higher when the pressure is even lower, which means, when the low-temperature micro-pressure radiant drying is performed under the pressure at the range between 5,000 and 50,000 Pa, the lower the pressure in the movable drying room, the higher the drying rate. The low-temperature micro-pressure radiant drying saves more than 40% energy than the high-temperature convective drying, and avoids low drying efficiency and waste of thermal energy caused by short drying stroke of conventional forced convective drying, thereby increasing the drying efficiency. In addition, as the method which combines the high-temperature convective drying method with the low-temperature micro-pressure radiant drying saves energy, and the power supply device thereof becomes small-sized, which lays foundation for the small size, light weight, and application on vehicles of drying equipment.

4. The vehicle-mounted steam boiler of the device for drying biomass fuel can use local energy sources. The vehicle-mounted steam boiler is a dual-purpose steam boiler which can use both natural gas and diesel, therefore, the device for drying biomass fuel in the invention can choose corresponding energy supply mode according to the specific energy condition at the distributing centers of the biomass fuel, thus the device features high adaptability.

5. The mobile vehicle platform device for drying biomass fuel is capable of on-site pressing and dehydration of the biomass fuel, which, in combination with the fuel drying, forms a serial processing line. The mechanical dehydration is combined with the deep drying, thus the drying of the biomass fuel is completed at the distributing center, and wet fuel long-distance transportation and secondary drying at the power plant is avoided, thereby decreasing transportation cost, reducing fuel cost and inventory volume of the power plant, and improving the profits of the power plant.

6. The device for drying biomass fuel comprises a heat recovery unit. The hot and wet air output from the movable drying room is used to heat the outdoor air in the second area of the heat recovery unit via the first area, and the preheated air is again input in the movable drying room. The heat recovery unit saves about 30% of energy, and further improves the energy-saving performance of the device in the invention.

DETAILED DESCRIPTION OF THE EMBODIMENTS

For further illustrating the invention, experiments detailing a method and a mobile vehicle platform device for drying biomass fuel are described below. It should be noted that the following examples are intended to describe and not to limit the invention.

Figure 1:
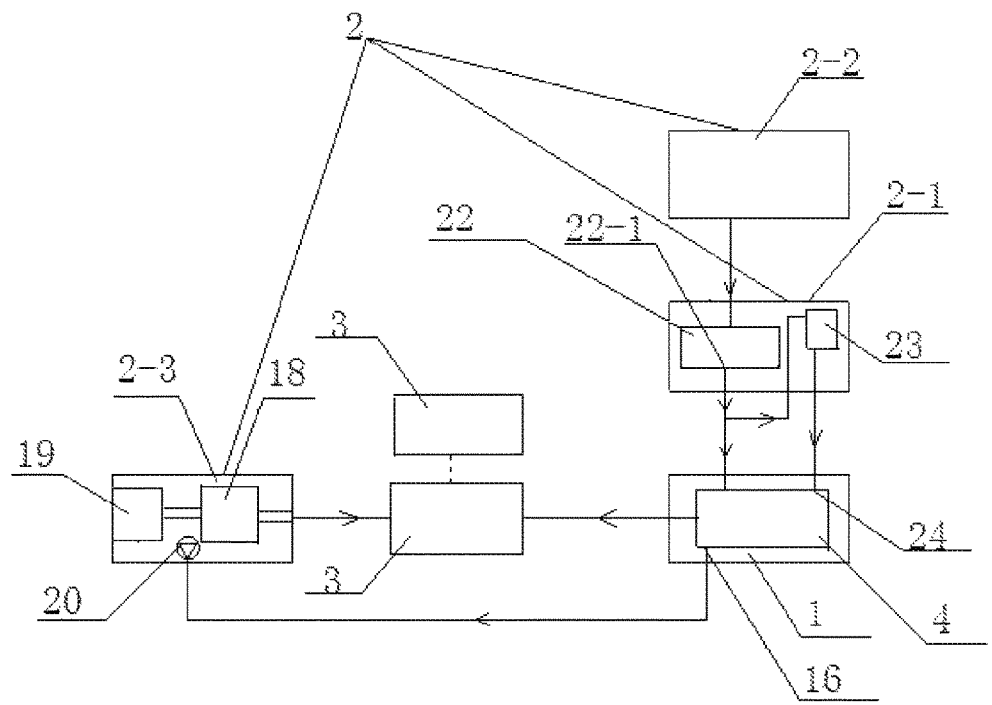
FIG. 1 is a connection diagram of a mobile vehicle platform device for drying biomass fuel in accordance with one embodiment of the invention.

As shown in FIG. 1, a mobile vehicle platform device for drying biomass fuel comprises a plurality of independent functional vehicles. The functional vehicles comprise at least one carrier vehicle 1 of drying equipment, at least two fuel transport vehicles 3, a carrier vehicle 2-1 of heating equipment, an energy supply vehicle 2-2, and a tool vehicle 2-3. The carrier vehicle 2-1 of heating equipment, the energy supply vehicle 2-2, and the tool vehicle 2-3 are carrier vehicles of auxiliary equipment.

Figure 2:
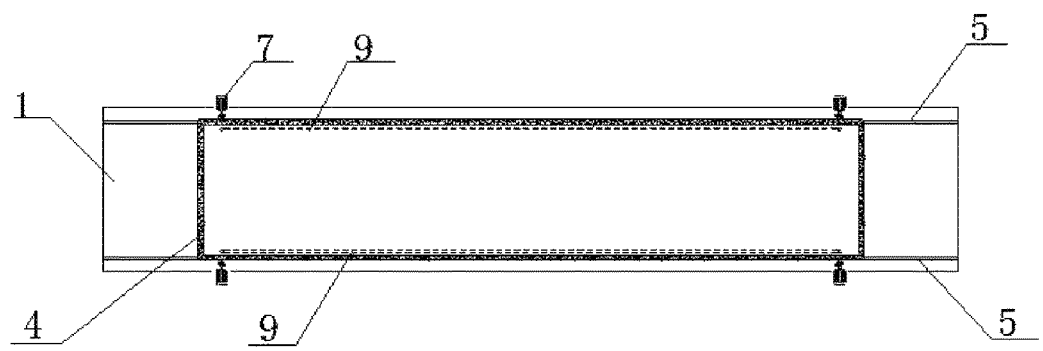
FIG. 2 is a top view of a carrier vehicle of drying equipment in FIG. 1.

As shown in FIG. 2, the at least one carrier vehicle 1 of drying equipment comprises a first track 5 and a movable drying room 4. The first track is disposed lengthwise on a floor of the at least one carrier vehicle of drying equipment. The movable drying room is disposed on the first track 5.

Figure 3:
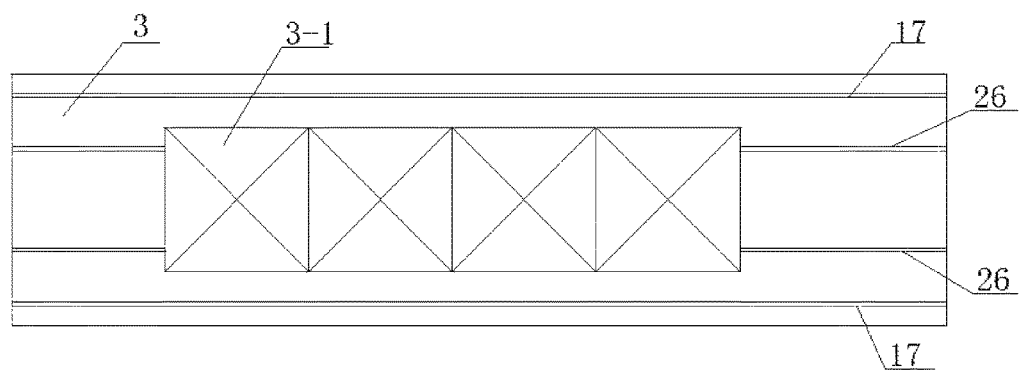
FIG. 3 is a top view of a fuel transport vehicle in FIG. 1.

As shown in FIG. 3, the fuel transport vehicles 3 comprise a second track 26, and a plurality of charging carriages 3-1. The second track is disposed lengthwise on a floor of the fuel transport vehicles. A plurality of charging carriages is connected in order and is disposed on the second track 26. The charging carriages 3-1 comprise an upper fuel stacking layer and a lower fuel stacking layer. A ventilation clearance 28 is disposed between the upper fuel stacking layer and the lower fuel stacking layer. An active inserter 3-11 is disposed on a bottom part of the upper fuel stacking layer of the charging carriages 3-1. In use, the active inserter 3-11 is moved out and the biomass fuel is stacked at the lower fuel stacking layer; the active inserter is mounted on the bottom part of the upper fuel stacking layer thereafter, and the biomass fuel is stacked at the upper fuel stacking layer. A second roller 30 is disposed at a bottom part of the charging carriages 3-1 and matches with the second track 26 (as shown in FIGS. 5-6), thus the charging carriages 3-1 separate from the fuel transport vehicles 3 during fuel unloading. A third track 17 is at an external side of the second track 26, the second track and the third track are in parallel. Specifications of the third track 17 and the first track 5 are identical, thus when a tail of the fuel transport vehicles 3 is connected to a tail of the at least one carrier vehicle 1 of drying equipment, the third track 17 is in line with the first track 5, and the movable drying room 4 is moved to cover the charging carriages 3-1 on the fuel transport vehicles 3 from the at least one carrier vehicle 1 of drying equipment (as shown in FIG. 4).

Figure 4:
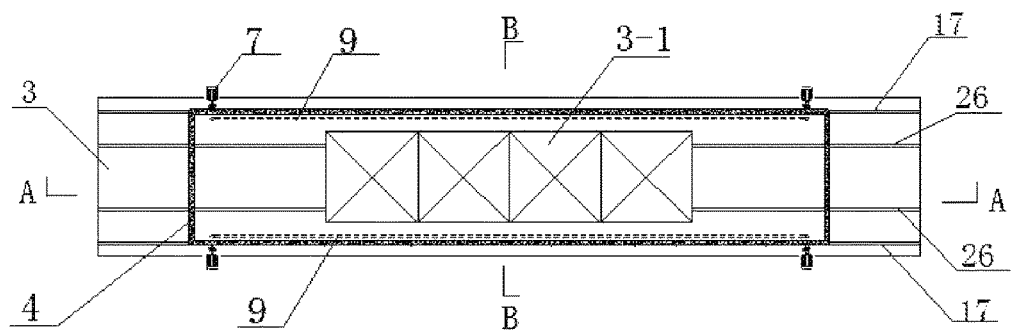
FIG. 4 is top view of a fuel transport vehicle when a movable drying room is moved to the fuel transport vehicle in FIG. 1.
Figure 5:
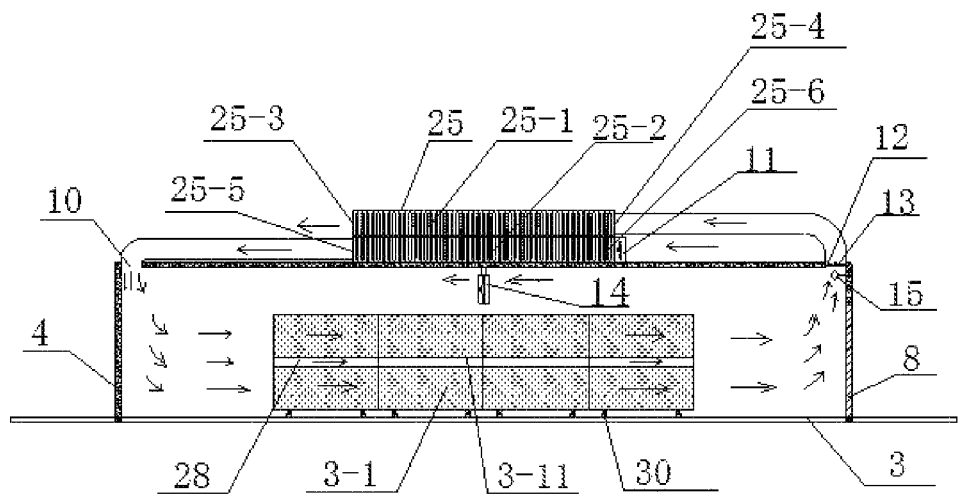
FIG. 5 is a cross-sectional view taken from line A-A in FIG. 4.
Figure 6:
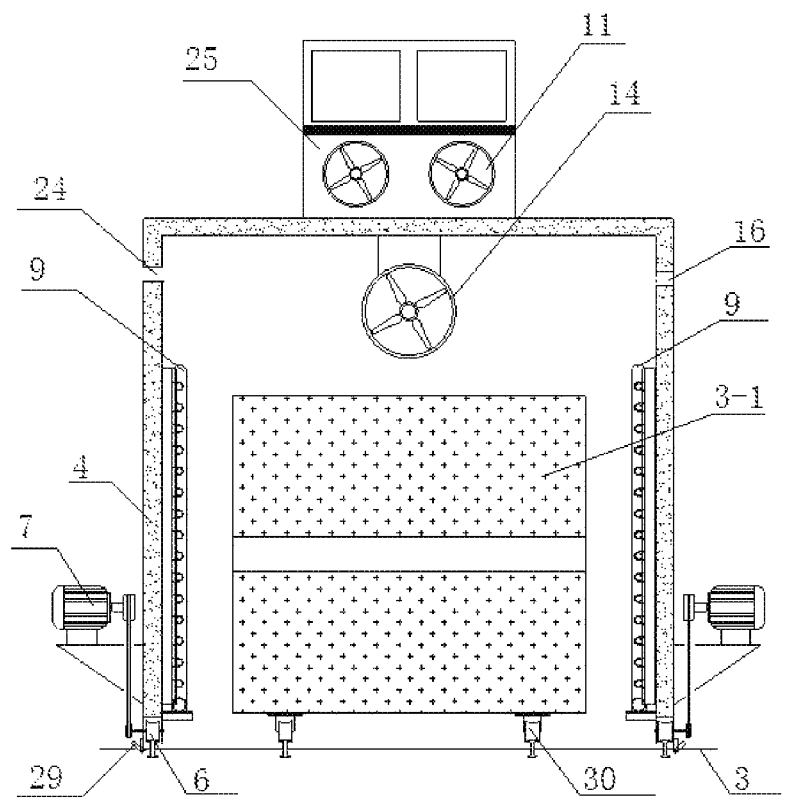
FIG. 6 is a cross-sectional view taken from line B-B in FIG. 4.

As shown in FIGS. 4-6, the movable drying room 4 is box-shaped with an open bottom. A side wall, a top plate, and a door 8 of the movable drying room are metal sheet frame structures, and are provided with an insulating liner. An outer wall of the movable drying room 4 is provided with a thermometer, a pressure gauge, and a hygrometer. The thermometer, the pressure gauge, and the hygrometer are configured to correspondingly monitor the temperature, pressure, and humidity in the movable drying room 4. The movable drying room 4 comprises a first roller 6. The first roller is disposed on a bottom part of the movable drying room and matches with the first track 5. A shaft of the first roller 6 is provided with a roller drive 7. The roller drive 7 is a motor speed reduction mechanism. The roller drive is configured to actuate automatic movements of the movable drying room 4. The door 8 is disposed at an end surface of the movable drying room 4. Two sides of the end surface of the movable drying room 4 are provided with turning plates 29. The turning plates are configured to seal the door 8 of the movable drying room. One end of a top of the movable drying room 4 is provided with a supply-air inlet 10. A blower 11 and a supply-air valve 32 are disposed at a supply-air channel of the supply-air inlet 10. An input end of the blower 11 is provided with a first sealing valve 33. The other end of the top of the movable drying room 4 is provided with an air outlet 12. An exhaust fan 13 and an exhaust valve 31 are disposed at the air outlet 12. An input end of the exhaust fan 13 is provided with a second sealing valve 34. A heat supply device 9 is disposed on a side wall of an inner chamber of the movable drying room 4. The heat supply device 9 is light tube radiators disposed on two side walls of the inner chamber of the movable drying room 4. A circulating fan 14 is disposed on a top of the inner chamber of the movable drying room 4. A direction of air current output from the circulating fan is identical with lengthwise direction of the movable drying room 4. A temperature and humidity sensor 15 is also disposed at the top of the inner chamber of the movable drying room 4 in the vicinity of the air outlet 12. A signal output end of the temperature and humidity sensor 15 is connected to actuators of the blower 11 and the exhaust fan 13 via control units, respectively. An air exhauster access 16 and a hot air inlet 24 are disposed on the outer wall of the movable drying room 4. A heat recovery unit 25 is disposed outside on a top of movable drying room 4. The heat recovery unit 25 comprises a first area 25-1 and a second area 25-2. The first area is separated from the second area, and a temperature in the first area is higher than a temperature in the second area. One end of the first area 25-1 comprises a gas outlet 25-3, and the other end of the first area 25-1 comprises a gas inlet 25-4. The gas outlet 25-3 is communicated with atmosphere. The gas inlet 25-4 is connected to the air outlet 12. One end of the second area 25-2 comprises a preheated air outlet 25-5, and the other end of the second area comprises an air inlet 25-6. The preheated air outlet 25-5 is connected to the supply-air inlet 10.

Figure 7:
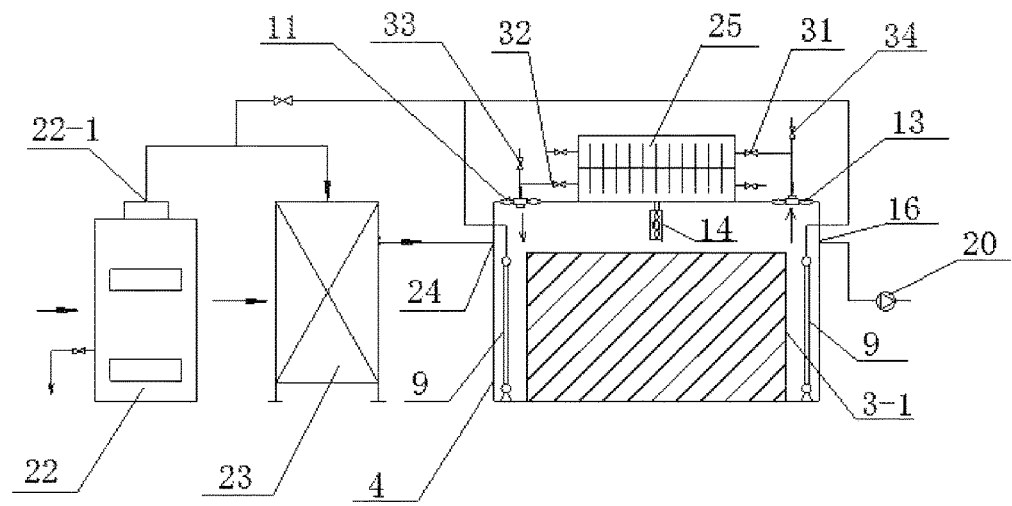
FIG. 7 is a diagram showing a relationship between a vehicle-mounted steam boiler, a steam-air heat exchanger, and a movable drying room in FIG. 1.

In a class of this embodiment, the energy supply vehicle 2-2 is a natural gas tank truck or a diesel tank truck. Under the working condition, an energy output end of the energy supply vehicle 2-2 is connected to an energy input end of the carrier vehicle 2-1 of heating equipment. As shown in FIGS. 1 and 7, the carrier equipment 2-1 of heating equipment is loaded with a vehicle-mounted steam boiler 22 and a steam-gas heat exchanger 23. The vehicle-mounted steam boiler 22 is a gas (diesel) boiler. The energy supply vehicle 2-2 provides natural gas or diesel for the vehicle mounted boiler 22. A steam output end 22-1 of the vehicle-mounted steam boiler 22 is connected to the steam input end of the light tube radiators on two side walls of the movable drying room 4 via a first heat pipe so as to heat the current in the movable drying room 4, and the steam output end is connected to a steam inlet of the steam-air heat exchanger 23 via a second heat pipe. A hot air outlet of the steam-air heat exchanger 23 is connected to the hot air inlet 24 on the outer wall of the movable drying room 4 so as to provide supplemental heat source for the current in the movable drying room 4.

In a class of this embodiment, the tool vehicle 2-3 is loaded with a vehicle-mounted press dehydrator 18, a mobile cutting machine 19, and an air exhauster 20. Under the working condition, the air exhauster 20 is connected to the air exhauster access 16 of the movable drying room 4. Air in the movable drying room 4 is exhausted so as to form a micro-pressure state.

Figure 8:
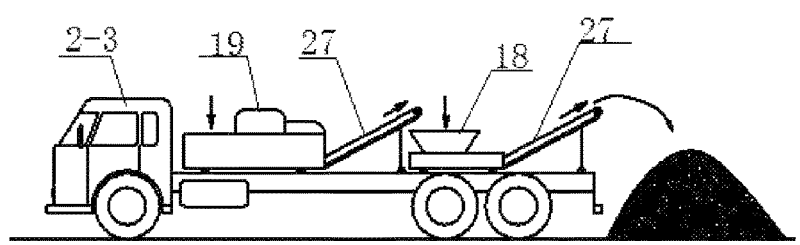
FIG. 8 is a diagram showing working process of a tool vehicle in FIG. 1.

In a class of this embodiment, major processes of the fuel processing line in conventional fixed workshops are separated to processes which are performed at a plurality of independent functional vehicles. As shown in FIGS. 8-12, the working process of the mobile vehicle platform device for drying biomass fuel is as follows:

1) Raw materials preprocessing: the tool vehicle 2-3 is moved to the distributing centers. Safe and proper water source and power source are chosen and are connected to the tool vehicle via pipes. Raw biomass fuel is cut to fragments between 20 and 30 mm long using the mobile cutting machine 19 on the tool vehicle 2-3 at distributing centers of biomass fuel. The fragments are transported via a mobile feeding belt 27 to the vehicle-mounted press dehydrator 18 to be mechanically pressed and dehydrated to form a filter cake (as shown in FIG. 8, the arrow in FIG. 8 shows the moving direction of the biomass fuel). A moisture content of the biomass fuel in the form of filter cake is reduced to at least below 50%. The moisture content of biomass fuel experienced fuel pressing in the example is between 40 and 45%.

Figure 9:
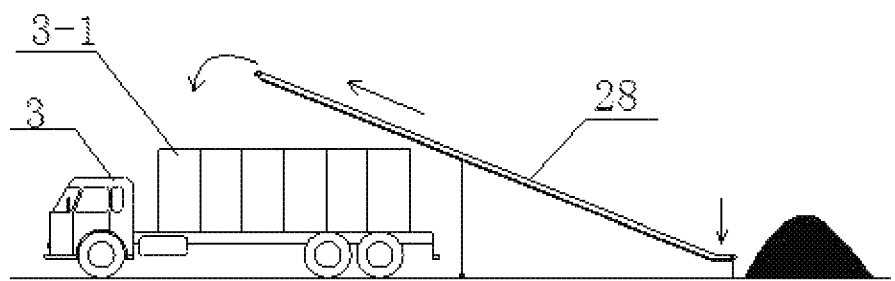
FIG. 9 is a diagram showing loading process of a fuel transport vehicle in FIG. 1.

2) Preprocessed biomass fuel loading: the biomass fuel in the form of filter cake is mashed and is transported via a mobile belt conveyor 28 to the charging carriages 3-1 on the fuel transport vehicles 3 (as shown in FIG. 9, the arrow in FIG. 9 shows the moving direction of the biomass fuel).

Figure 10:
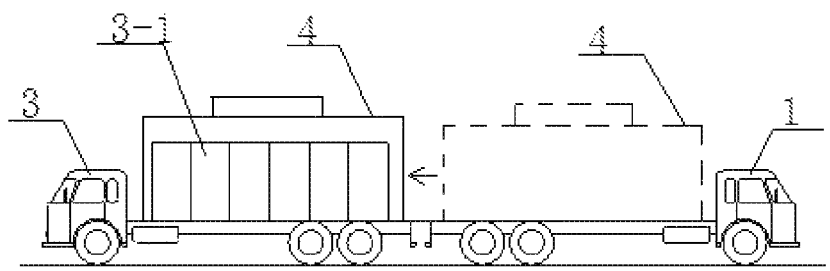
FIG. 10 is a diagram showing transfer process of a movable drying room from a carrier vehicle of drying equipment to a fuel transport vehicle in FIG. 1.

3) Connection of the functional vehicles: the loaded fuel transport vehicles 3 are moved to the at least one carrier vehicle 1 of drying equipment. Tails of the fuel transport vehicles 3 and the at least one carrier vehicle 1 of drying equipment are connected. The turning plate 29 of the movable drying room 4 is turned to open the door 8. The roller drive 7 is actuated, and the movable drying room 4 of the at least one carrier vehicle 1 of drying equipment is moved to the fuel transport vehicle 3. The charging carriages 3-1 are covered and sealed in the inner chamber of the movable drying room 4 (as shown in FIG. 10, the arrow in FIG. 10 shows the moving direction of the movable drying room 4). Then the turning plate 29 is turned to close the door 8, and every nook and cranny of the movable drying room 4 are sealed using flexible fiber, rubber, and adhesive tapes, etc.

Figure 11:
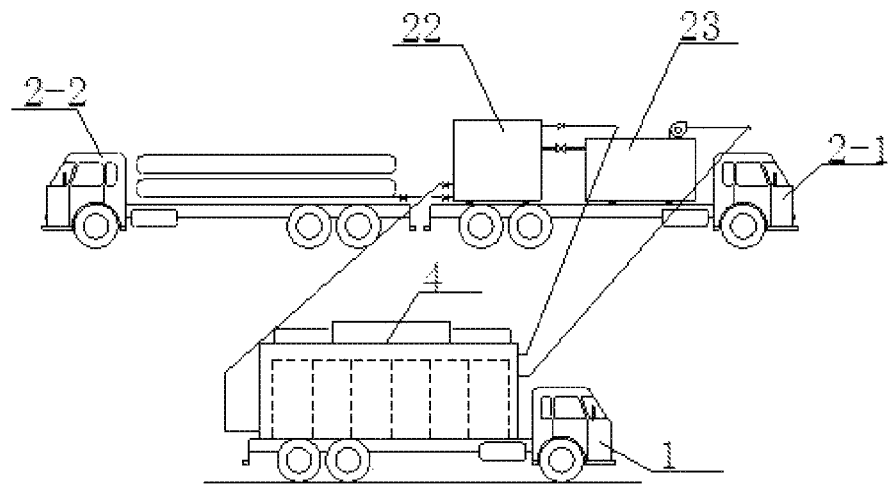
FIG. 11 is a diagram showing a cooperative drying process of an energy supply vehicle, a carrier vehicle of heating equipment, and a carrier vehicle of drying equipment in FIG. 1.

4) Convective drying of biomass fuel: as shown in FIG. 11, the carrier vehicle 2-1 of heating equipment provides heat source for the movable drying room 4, and current in the movable drying room 4 is heated. A specific heating process is as follows: the vehicle-mounted steam boiler 22 on the carrier vehicle 2-1 of heating equipment generates high-pressure vapor. A part of the high-pressure vapor is transmitted to the heat supply device 9 in the movable drying room 4 which is the light tube radiators on two side walls of the inner chamber of the movable drying room 4. The heat supply device heats the current in the movable drying room 4. The rest of the high-pressure vapor is used by the steam-air heat exchanger 23 to generate hot air. The hot air is directly input in the movable drying room 4 via the hot air inlet 24. The hot air provides supplemental heat source for the current in the movable drying room 4. The drying temperature is controlled to be between 100 and 180° C. The circulating fan 14 is turned on to circulate the air in the movable drying room, and a speed of the drying air being controlled to be between 1.5 and 2.0 m/s. The hot dry air fully absorbs moisture in the biomass fuel and is circulated to perform convective drying of biomass fuel in the charging carriages 3-1. When an air humidity in the movable drying room 4 is measured by the temperature and humidity sensor 15 to be between 85 and 92%, the exhaust fan 13 and the exhaust valve 31 are actuated, meanwhile the blower 11 and the supply-air valve 32 are actuated correspondingly, and moisture is exhausted. When the air humidity in the movable drying room 4 is reduced to between 50 and 60%, the exhaust fan 13 and the exhaust valve 31 are turned off, and moisture exhaustion is ended. Air is continued to be circulated in the movable drying room 4. The moisture exhaustion and indoor air circulation are repeated accordingly in the movable drying room 4 until the air humidity in the movable drying room 4 is constant, which means a drying rate appears to be obviously lowered (the humidity measured by the temperature and humidity sensor 15 is constant, or the humidity variation gets smaller), and the convective drying is completed.

5) Radiant drying under micro-pressure and under low temperature: following the convective drying, a pressure in the movable drying room 4 is controlled to be between 5,000 and 50,000 Pa. A temperature in the movable drying room 4 is controlled to between 60 and 80° C., thus the biomass fuel is under micro-pressure state. Radiant heat is transferred to the biomass fuel to dehydrate the biomass fuel, when an air humidity in the movable drying room is between 85 and 92%, moisture exhaustion is started. Radiant drying is completed until the moisture content of the biomass fuel in the charging carriages 3-1 is reduced to lower than 35%, and preferably between 25 and 33%. To be specific, the radiant drying can be realized through two ways: 1. the first sealing valve 33 and the second sealing valve 34 are closed following the high-temperature convective drying, and the movable drying room 4 is completely sealed, meanwhile the hot air system is halted. The air exhauster 20 on the tool vehicle 2-3 is actuated to exhaust air, and the light tube radiators continue to supply heat. The thermometer, the pressure gauge, and the hygrometer mounted on the outer side wall of the movable drying room 4 monitor the air conditions in the movable drying room 4, and the biomass fuel in the movable drying room 4 is dried under the pressure between 5,000 and 50,000 Pa and under a temperature of between 60 and 80° C. The radiant drying under micro-pressure and low temperature is completed when the moisture content of the biomass fuel is decreased to lower than 35%. 2. The second way of radiant drying follows the basic processes and requirements of the first way, except that only the first sealing valve 33 at the supply-air inlet 10 is closed, and the second sealing valve 34 remains open; the exhaust fan 13 is turned on to exhaust air, and the pressure in the movable drying room 4 is decreased.

6) Cyclic operation: the drying equipment is turned off following the radiant drying. The turning plate 29 is turned to open the door 8. The roller drive 7 is actuated, and the movable drying room 4 is moved to cover and seal the charging carriages 3-1 on the next fuel transport vehicle 3. Steps 4)-5) are repeated until all of the biomass fuel in the fuel transport vehicles 3 is dried.

Figure 12:
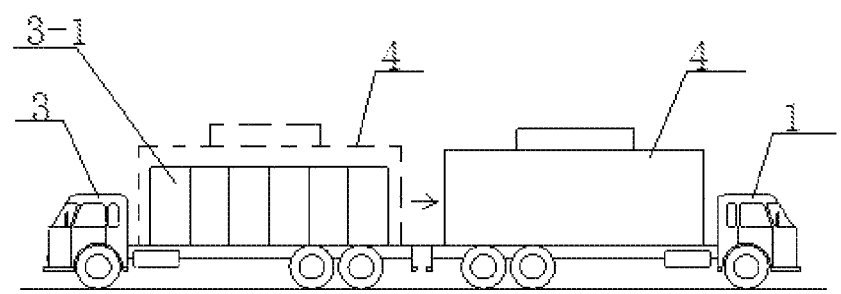
FIG. 12 is a diagram showing that a movable drying room is returned from a fuel transport vehicle to a carrier vehicle of drying equipment in FIG. 1.

Where, the movable drying room 4 is moved onto the next fuel transport vehicle 3 via two paths: 1. the movable drying room 4 is returned to the at least one carrier vehicle 1 of drying equipment. The tail of the at least one carrier vehicle 1 of drying equipment is connected to a tail of next fuel transport vehicle 3, and the movable drying room 4 is moved onto the next fuel transport vehicle 3. 2. The tail of the fuel transport vehicle 3 is connected to a tail of next fuel transport vehicle 3, and the movable drying room 4 is directly moved onto the next fuel transport vehicle 3. The movable drying room 4 is returned to the at least one carrier vehicle 1 of drying equipment when all of the biomass fuel in the fuel transport vehicles 3 are dried (as shown in FIG. 12, the arrow in FIG. 12 shows the moving direction of the movable drying room 4).

7) Biomass fuel transportation: dried biomass fuel in the fuel transport vehicles 3 is directly transported to a power plant without extra discharging and loading process.

In 4)-5), the hot and wet air output from the air outlet 12 of the movable drying room 4 is used to heat the outdoor air in the second area 25-2 of the heat recovery unit 25 via the first area 25-1, which means, in order to save energy, the outdoor air is heated by the heat recovery unit 25 and is input in the movable drying room 4. The radiant drying saves more than 40% energy than the convective drying, which lays a foundation for the small size, and application on vehicles of drying equipment.

The thermal efficiency of the movable drying room 4 in the example is estimated as follows: a 2 t/h natural gas boiler uses 160 Nm$^3$/h natural gas and generates 2 t/h, 0.4 MPa high-pressure vapor. The utilization coefficient of heat source is 94%. In summer, one part of heat source is used by two 1 t/h light tube radiators to dry the biomass fuel, and the thermal efficiency thereof reaches 90%; the other part of the heat source is used by the steam-air heat exchanger 23 to exchange heat with air and generate hot air at 100° C. The thermal efficiency thereof is 85%. The hot air exchanges heat with the biomass fuel in the movable drying room 4. Normally, 70% of heat is absorbed by the biomass fuel, and 30% of heat is taken away by the moisture exhaustion, so an actual thermal efficiency of the movable drying room 4 is only 53%. To solve this, the movable drying room 4 is provided with the heat recovery unit 25 to recovery heat, and the thermal efficiency of the movable drying room 4 can reach 75%. When the thermal efficiency of the light tube radiators is 85%, the total thermal efficiency of the heat source reaches 79.5%. In winter, the thermal efficiency is a little bit lower than the thermal efficiency in summer. The thermal efficiency of the hot-air drying is about 69%, and the total thermal efficiency of heat source in winter reaches 77%.

The mobile vehicle platform device for drying biomass fuel in the embodiment of the invention can not only used to dry biomass fuel, but also used to dry vegetable, fruits, and grains, which can develop the rural economy and broaden the application of device.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for drying biomass fuel, the method employing a plurality of independent functional vehicles to dry biomass fuel, the functional vehicles comprising at least one carrier vehicle of drying equipment and a plurality of fuel transport vehicles, the at least one carrier vehicle of drying equipment comprising a movable drying room, the fuel transport vehicles each comprising a plurality of charging carriages, the method comprising:
   1) collecting and cutting raw biomass fuel into fragments in length of between 20 and 50 mm at distributing centers of biomass fuel; mechanically squeezing and dehydrating the fragments to yield biomass fuel in a form of filter cake, a moisture content in the biomass fuel in the form of filter cake being reduced to at least below 50%;
   2) mashing and loosening the biomass fuel in the form of filter cake; and loading the biomass fuel in the charging carriages of the fuel transport vehicles;
   3) connecting tails of the fuel transport vehicles and the at least one carrier vehicle of drying equipment; moving the movable drying room of the at least one carrier vehicle of drying equipment onto the fuel transport vehicles, and covering and sealing the charging carriages in an inner chamber of the movable drying room;
   4) convectively drying the biomass fuel in the charging carriages in the inner chamber of the movable drying room using circulating dry air at a temperature of between 100 and 180° C., and a speed of the circulating dry air being controlled to be between 1.5 and 2.0 m/s; regularly exhausting moisture out of the movable drying room;
   5) exhausting air in the movable drying room following convective drying in 4); controlling a pressure in the movable drying room to be between 5,000 and 50,000 Pa; controlling a temperature in the movable drying room to be lower than 85° C.; dehydrating the biomass fuel using radiant heat, until a moisture content of the biomass fuel in the charging carriages is reduced to lower than 35%;
   6) moving the movable drying room to cover and seal the charging carriages of a next fuel transport vehicle following radiant drying in 5); repeating 4)-5) until all of the biomass fuel in the fuel transport vehicles is dried; and
   7) directly transporting dried biomass fuel in the fuel transport vehicles to a power plant.

2. The method of claim 1, wherein in 4), moisture exhaustion is started when an air humidity in the movable drying room is between 85 and 92%; the moisture exhaustion is terminated when the air humidity is reduced to between 50 and 60%; and when the air humidity in the movable drying room is constant, the convective drying is terminated.

3. The method of claim 1, wherein in 5), a temperature in the movable drying room (4) is controlled to be between 60 and 80° C.; moisture exhaustion is started when an air humidity in the movable drying room (4) is between 85 and 92%; and the radiant drying is terminated when the moisture content in the biomass fuel is decreased to between 25 and 33%.

4. The method of claim 1, wherein in 6), the movable drying room is first returned to the at least one carrier vehicle of drying equipment; thereafter, a tail of the at least one carrier vehicle of drying equipment is connected to a tail of the next fuel transport vehicle, and the movable drying room is moved onto the next fuel transport vehicle.

5. The method of claim 1, wherein in 6), a tail of the fuel transport vehicle is first connected to a tail of the next fuel transport vehicle, and then the movable drying room is directly moved onto the next fuel transport vehicle; the movable drying room is returned to the at least one carrier vehicle of drying equipment when all of the biomass fuel in the fuel transport vehicles are dried.

6. The method of claim 1, wherein
the functional vehicles further comprise carrier vehicles of auxiliary equipment; the carrier vehicles of auxiliary equipment comprise at least one carrier vehicle of heating equipment and at least one energy supply vehicle; and
in use, an energy output end of the energy supply vehicle is connected to an energy input end of the carrier vehicle of heating equipment; a heat source output end of the carrier vehicle of heating equipment supplies heat source for the movable drying room of the at least one carrier vehicle of drying equipment and heats air current in the movable drying room.

7. The method of claim 6, wherein
the carrier vehicles of auxiliary equipment further comprise a tool vehicle; the tool vehicle is loaded with a vehicle-mounted press dehydrator, a mobile cutting machine, and an air exhauster; and
in use, the tool vehicle moves to the distributing centers of biomass fuel; the biomass fuel is cut and pressed using the mobile cutting machine and the vehicle-mounted press dehydrator on the tool vehicle; air in the movable drying room of the at least one carrier vehicle of drying equipment is exhausted using the air exhauster on the tool vehicle.

8. A mobile device for drying biomass fuel, the device comprising:
a plurality of independent functional vehicles, the functional vehicles comprising at least one carrier vehicle of drying equipment and a plurality of fuel transport vehicles;
wherein
the at least one carrier vehicle of drying equipment comprises a first track and a movable drying room; the first track is disposed lengthwise on a floor of the at least one carrier vehicle of drying equipment; the movable drying room is disposed on the first track; an end surface of the movable drying room is provided with a door; one end of a top of the movable drying room is provided with a supply-air inlet; a blower is disposed at a supply-air channel of the supply-air inlet; the other end of the top of the movable drying room is provided with an air outlet; an exhaust fan is disposed at the air outlet; a heat supply device is disposed on a side wall of an inner chamber of the movable drying room; a circulating fan is disposed on a top of the inner chamber of the movable drying room; a temperature and humidity sensor is also disposed in the inner chamber of the movable drying room; a signal output end of the temperature and humidity sensor is connected to actuators of the blower and the exhaust fan, respectively; an air exhauster access is disposed on an outer wall of the movable drying room;
the fuel transport vehicles comprise a second track, a third track, and a plurality of charging carriages; the second track is disposed lengthwise on a floor of the fuel transport vehicles; a plurality of charging carriages is connected in order and is disposed on the second track; the third track is at an external side of the second track, and the second track and the third track are in parallel; specifications of the third track and the first track are identical; when a tail of the fuel transport vehicles is connected to a tail of the at least one carrier vehicle of drying equipment, the third track is in line with the first track; and the movable drying room is moved to cover the charging carriages on the fuel transport vehicles from the at least one carrier vehicle of drying equipment.

9. The device of claim 8, wherein the functional vehicles further comprise carrier vehicles of auxiliary equipment; the carrier vehicles of auxiliary equipment comprise at least one carrier vehicle of heating equipment and at least one energy supply vehicle; in use, an energy output end of the energy supply vehicle is connected to an energy input end of the carrier vehicle of heating equipment; a heat source output end of the carrier vehicle of heating equipment is connected to the heat supply device in the movable drying room and heats air current in the movable drying room.

10. The device of claim 9, wherein the heat supply device is light tube radiators disposed on two side walls of the inner chamber of the movable drying room; the carrier vehicle of heating equipment is loaded with a vehicle-mounted steam boiler; and a steam output end of the vehicle-mounted steam boiler is connected to a steam input end of the light tube radiators via a first heat pipe.

11. The device of claim 10, wherein the carrier vehicle of heating equipment is loaded with a steam-air heat exchanger; the steam output end of the vehicle-mounted steam boiler is connected to the steam input end of the light tube radiators via a first heat pipe, and is connected to a steam inlet of the steam-air heat exchanger via a second heat pipe; a hot air outlet of the steam-air heat exchanger is connected to a hot air inlet on the outer wall of the movable drying room and provides supplemental heat source for the current in the movable drying room.

12. The device of claim 9, wherein the energy supply vehicle is a natural gas tank truck or a diesel tank truck.

13. The device of claim 9, wherein the carrier vehicles of auxiliary equipment further comprise a tool vehicle; the tool vehicle is loaded with a vehicle-mounted press dehydrator, a mobile cutting machine, and an air exhauster; in use, the air exhauster is connected to the air exhauster access on the movable drying room to exhaust air in the movable drying room on the carrier vehicle, and the movable drying room is in a micro-pressure state.

14. The device of claim 8, wherein the movable drying room comprises a first roller; the first roller is disposed on a bottom part of the movable drying room and matches with the first track; a shaft of the first roller is provided with a roller drive; and the roller drive is configured to actuate automatic movements of the movable drying room.

15. The device of any one of claim 14, wherein the roller drive is a motor speed reduction mechanism.

16. The device of claim 8, wherein the circulating fan is disposed at a central part of the top of the inner chamber of the movable drying room; a direction of air current output from the circulating fan is identical with lengthwise direction of the movable drying room; and the temperature and humidity sensor is disposed on the top of the inner chamber of the movable drying room in the vicinity of the air outlet.

17. The device of claim 8, wherein a heat recovery unit is disposed outside on a top of movable drying room; the heat recovery unit comprises a first area and a second area; the first area is separated from the second area, and a temperature in the first area is higher than a temperature in the second area; one end of the first area comprises a gas outlet, and the other end of the first area comprises a gas inlet; the gas outlet is communicated with atmosphere; the gas inlet is connected to the air outlet; one end of the second area comprises a preheated air outlet, and the other end of the second area comprises an air inlet; and the preheated air outlet is connected to the supply-air inlet.

18. The device of claim 8, wherein two sides of the end surface of the movable drying room are provided with turning plates; and the turning plates are configured to seal the door of the movable drying room.

19. The device of claim 8, wherein the movable drying room is box-shaped with an open bottom; a side wall, a top plate, and the door of the movable drying room are metal sheet frame structures, and are provided with an insulating liner.

20. The device of claim 8, wherein the charging carriages comprise an upper fuel stacking layer and a lower fuel stacking layer; a ventilation clearance is disposed between the upper fuel stacking layer and the lower fuel stacking layer; a second roller is disposed at a bottom part of the charging carriages and matches with the second track.

21. The device of claim 20, wherein an active inserter is disposed on a bottom part of the upper fuel stacking layer of the charging carriages.

* * * * *